Jan. 30, 1951  L. E. ANDERSON  2,539,768
FILTER ELEMENT AND METHOD OF MAKING THE SAME
Filed May 5, 1947  2 Sheets-Sheet 1
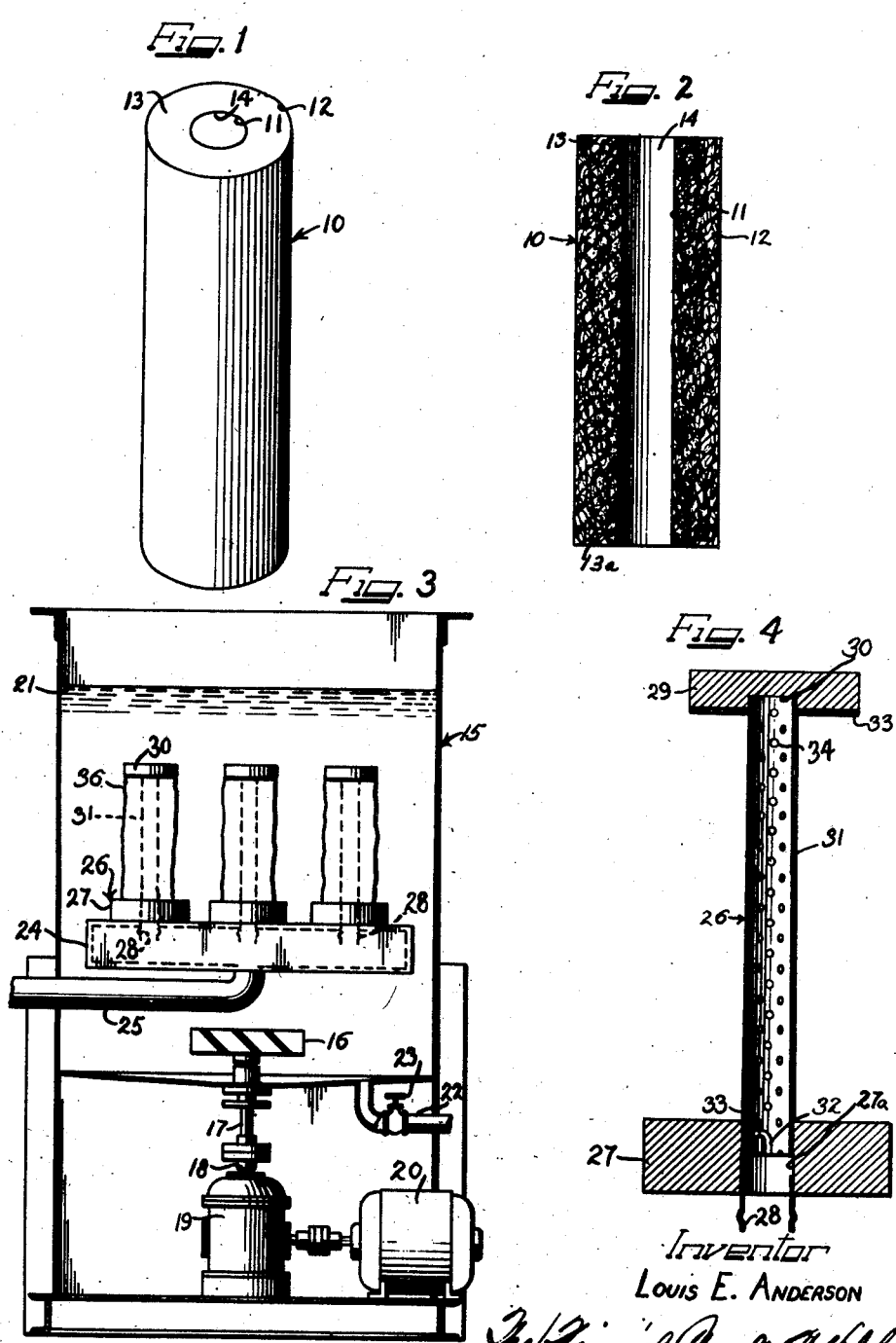
Inventor
Louis E. Anderson Jan. 30, 1951 L. E. ANDERSON 2,539,768
FILTER ELEMENT AND METHOD OF MAKING THE SAME
Filed May 5, 1947 2 Sheets-Sheet 2
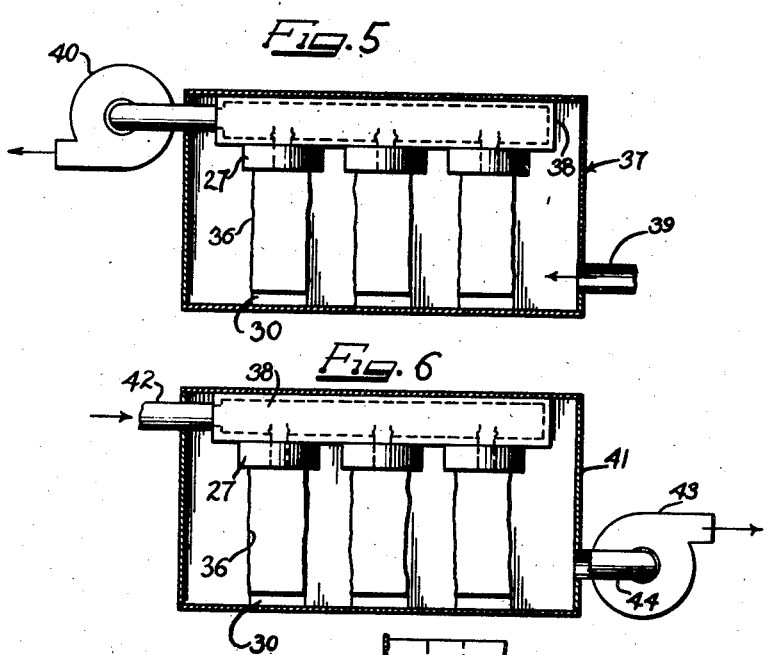
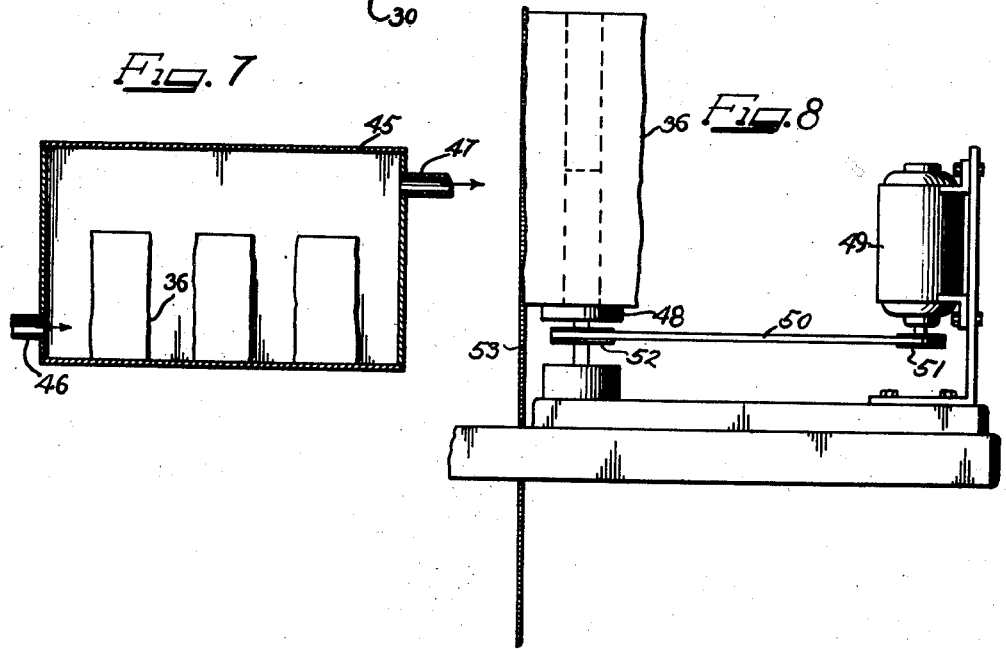
Inventor
Louis E. Anderson

UNITED STATES PATENT OFFICE 2,539,768

FILTER ELEMENT AND METHOD OF MAKING THE SAME

Louis E. Anderson, Chicago, Ill., assignor, by mesne assignments, to The Cuno Engineering Corporation, Meriden, Conn., a corporation of Connecticut Application May 5, 1947, Serial No. 745,909

7 Claims. (Cl. 210—204)

This invention relates to a filter element and to a method of making the same. More particularly, the invention relates to the manufacture of a filter element of the depth filtration type in the form of a relatively rigid, self-supporting, thick-walled tubular element composed entirely of resin-impregnated fibrous material.

The filter element of my present invention comprises a relatively rigid, self-supporting, thick-walled, tubular member composed entirely of resin-impregnated and bonded fibrous material. The element is intended to be used for filtering liquids and gases which are caused to flow radially inwardly under a differential pressure. In order to obtain the maximum filtering efficiency, the fibrous structure of the filter element is of graded porosity, with the size of the pores progressively increasing radially outwardly toward the outer surface. By virtue of such graduated porosity, or density, as the fluid flows inwardly through progressively smaller and more numerous interstices, the foreign particles to be filtered out penetrate to varying depths according to their size. This means that the filter element can accommodate more solids without affecting flow, with a consequently longer effective life before the elements need replacing. Such graduated porosity in the filter element is accomplished by accreting resin-impregnated fibers from an aqueous uniform dispersion of such fibers under controlled conditions as to the amount of vacuum used in effecting such accretion and as to the composition and characteristics of the fibrous stock used.

The fibrous material employed in making my filter element is largely made up of wool fibers, which are relatively "free." While the filter element can be made entirely from wool, owing to the freeness of wool fibers the resulting filter element would be too porous to filter out relatively small particles, say, of the order of 35 microns or less. Accordingly, for the filtration of such relatively smaller sized particles it is desirable to admix with the wool a fiber capable of acquiring relatively slower properties, and preferably a fiber of finer diameter, such as a diameter of the order of 10 microns or less. Esparto, Yucca, as well as other fibers, can advantageously be admixed with wool fibers in proportions up to 40% by weight of the total fibrous composition.

Where the finer and slower types of fibers are mixed with wool, the wool preferably should be beaten separately first and then the slower fibers added. The time of beating should be controlled in accordance with the fibers used and the density of the filter element that is desired. Excessive beating of either type of fiber decreases the life of the filter element.

After the proper length and degree of beating, the mixed stocks are mixed with a dispersion of resin particles, or resin-forming ingredients, either in the form of water or alcohol dispersion. An aqueous dispersion of the resin-impregnated fibers is thus made up ahead of the felting tank to the proper consistency and then fed into the felting tank as needed and there kept thoroughly agitated in order to maintain a uniform consistency throughout the entire mass.

In accordance with the accretion step that I employ, one or more perforate formers, or dies, are immersed within the suspension in the felting tank and the resin-impregnated fibers are caused to be accreted upon said formers by the application of a controlled degree of suction imposed upon the interior of said formers. By the control of the degree of vacuum and the length of time over which the vacuum is applied, in conjunction with the proper control of the characteristics of the fibers, a filter carcass is produced of the depth, or thickness, and graded porosity that is desired. The proportion of resin in the fibrous carcass is also a factor in producing a filter element of the desired degree of strength to withstand the pressure drop to which it may be subjected in use. A specific composition that has been found particularly suitable is one comprising 85% wool fibers, 15% esparto fibers and 35% resin concentration, by weight of the finished filter element.

After the formation of the wet carcass, a substantial proportion of the water or other solvent is removed by drawing hot air through the filter carcass. After drying, the resin is set to prevent migration by blowing air through the filter carcass under controlled temperature and controlled time conditions. By passing the air through the carcass in one direction to remove the solvent or water, and in the other direction during the setting of the resin, the uniform distribution of the resin throughout the mass of the carcass is substantially effected. After setting, the filter carcass is cured by heat under temperature and time conditions appropriate for the curing of the particular resin used.

In the final step, the filter cartridge is sized to accurate dimensions by cutting or trimming mechanically, as by means of a knife, saw or grinder. This removes the outer surface of the carcass and any resin film that may have been formed thereover, thus leaving the outer surface with an open porous structure for filtering purposes.

It is therefore an important object of this invention to provide a filter element of novel construction having improved filtering efficiency.

It is a further important object of this invention to provide a filter element comprising a thick-walled, tubular, relatively rigid, self-supporting body of resin-impregnated fibrous material of progressively increasing porosity from the inner to the outer surface, the fibrous material consisting of accreted fibers impregnated and bonded together with a resinous binding medium, with the resin in such proportions as to give sufficient rigidity to the element to obviate the necessity of using reenforcing fabric yet in insufficient proportions to interfere with the filtering properties of the filter as a depth-type filter.

It is a further important object of this invention to provide a method of making a filter element by accretion of resin-impregnated fibers to produce a carcass of progressively increasing porosity toward the outer surface, and to dry said carcass, and set and cure the resinous content thereof in such a manner as to secure substantial uniformity of dispersion of the resinous content throughout the mass of the filter element.

It is a further important object of this invention to provide a method of forming a filter element of accreted, resin-impregnated fibers and during the course of manufacture of such a filter element to cause heated air to pass first in one direction and then in the opposite direction to dry the resin-impregnated fibers, and set and cure the resin content thereof so as to leave the resinous binding material substantially uniformly dispersed throughout the mass of the filter element.

It is a further important object of this invention to provide a method of making a filter element from accreted resin-impregnated fibers, which method involves a final step of trimming the surfaces of the filter element to remove any resin film that may be formed thereover, thereby leaving said surface in an open, porous condition effective for depth filtration.

Other and further important objects of this invention will be apparent from the disclosures in the specification and the accompanying drawings.

On the drawings:

Figure 1 is an elevational perspective view of a finished filter element embodying the principles of my invention.

Figure 2 is a longitudinal sectional view of the same.

Figure 3 is a somewhat schematic vertical sectional view of the felting tank and equipment, illustrating the step of accreting the fibers on a porous form or die.

Figure 4 is a vertical sectional view of a former, or die.

Figure 5 is a somewhat schematic view of the drying equipment for removing water from the wet carcasses.

Figure 6 is a somewhat schematic view of the equipment used for setting the resin in the resin-impregnated fibrous carcasses.

Figure 7 is a somewhat schematic view of a curing oven.

Figure 8 is a somewhat schematic view of the equipment used in trimming the cartridge to final size and dimensions.

As shown on the drawings:

The finished filter element indicated generally by the reference numeral 10 in Figures 1 and 2, comprises a thick-walled, hollow cylindrical cartridge having inner and outer cylindrical surfaces 11 and 12, respectively, and plane end surfaces 13 and 13a. In use, the filtration occurs from the outside towards the inside of the cartridge, the fluid after filtering through the thick wall of the cartridge being collected in the bore 14 defined by the inner wall 11 and passing from said bore to the point of use.

As will later be explained in greater detail, the body of the filter element 10 is formed from accreted, resin-impregnated fibers so deposited as to provide graduated porosity for depth filtration, with the pores increasing in size from the inner surface 11 to the outer surface 12, as best indicated in Figure 2. By reason of such graduated porosity, as the fluid to be filtered flows inwardly through the progressively smaller and more numerous interstices, the foreign particles to be filtered out penetrate to varying depths in accordance with their size, thus enabling the filter element to accommodate more solids without affecting the rate of flow to the extent that would be the case if the pores of the filter were of uniform size throughout. As a consequence, the filter element has a longer effective life before it needs to be replaced.

The fiber found to be most satisfactory for use in the manufacture of the filter element 10 is wool fiber. While the filter element may be composed entirely of wool fiber, such a filter would not have the ability to filter out relatively small foreign particles, say, of a size of 35 microns or less, owing to the "freeness" of wool fibers and the consequent inability of the wool fibers to form an accretion having sufficiently small interstices, or voids. Preferably, therefore, a finer fiber, or one having "slower" characteristics, is admixed with the wool fiber. Esparto and Yucca fibers, as well as others, have been found satisfactory for this purpose, and may be used in amounts up to 40% of the total fiber mixture. A preferred mixture is 85% of wool fiber and 15% of esparto, and a preferred range is from 90% to 60% of wool and from 10 to 40% of fibers that are finer than wool and of the order of 10 microns in diameter, or less. As the finer fibers, asbestos fibers, for instance, may be used which may have a diameter as small as 2 microns or less. In general, all of the fibers employed in making the filter of my invention will be less than ¾" in length.

In order to impart to the filter element 10 the necessary amount of strength and rigidity, as well as to waterproof the fibers so that they will not become soggy, or soft, in the presence of water, or other fluids, a resin is used to impregnate the fibers and to bond them together in relatively fixed relationship. The amount of the resin used may vary between 15 and 60% by total weight of the filter element, but in general, should be around 35% for best results. Various resins, including the thermosetting resins such as the phenolformaldehyde condensation products, urea-formaldehyde condensation products and the melamine resins, may be used, but thermoplastic resins may be similarly employed.

Since the filter element 10 is intended in use to be clamped endwise between the heads of the filter assembly and since filtration through the element is effected by maintaining a substantial pressure differential between the outside and inside of the filter, it is essential that the filter element have a sufficient degree of compressive strength to withstand deformation under such loads as may be imposed upon it. In general, the filter element 10 is so constructed as to withstand compression loads of 50 pounds per square inch and higher, without the use of any reenforcing fabrics, such as the metal wire fabrics usually associated with fibrous filter elements. This relatively high compressive strength is obtained as a result of the composition of the filter element and the conditions under which it is manufactured, as will now be pointed out.

To prepare the fibers for the secretion step, the fibers are first subjected to a beating action in aqueous suspension, as by means of a conventional beater or other refining equipment, such as a Jordan. In the case of a fiber mixture, such as preferred mixture of 85% wool and 15% of esparto fiber, the wool is preferably first beaten separately for a period of an hour or so and then the esparto fiber is added and beaten with the wool for a matter of twenty minutes, or thereabouts. The time of beating is controlled in accordance with the fibers used and also in accordance with the density of the filter element that is desired. The directions just given are suitable for the manufacture of a filter element having pores of such size as to filter out effectively foreign particles of 25 micron diameter, or larger. The time of beating and the severity of beating also affect the life of the filter element, since there is a point for each fiber beyond which extended beating decreases the useful life of the filter element.

After beating, the stock is conveyed to storage tanks where it is kept agitated and at a proper consistency for feeding to the felting tank, which is illustrated in Figure 3 and indicated generally by the reference numeral 15. Said felting tank equipment 15 is shown more or less schematically to illustrate the principle, and is to be understood as not restricted to the particular type or size of equipment illustrated.

Said felting equipment tank 15 is provided centrally and near its bottom with an agitator, such as a turbine 16, the shaft 17 of which extends through the bottom wall of the tank and is coupled to a driving shaft 18, driven through a speed reducer 19 from a motor 20. Stock of the proper consistency is charged into the felting tank 15 to a level such as that indicated by the line 21 and the turbine 16 set into operation to maintain a uniform consistency of stock throughout the tank. Said tank includes a draw-off line 22 for draining the tank, which line is normally closed by a valve 23.

Means are positioned within the tank 15 for effecting the forming operation. Such means comprises a manifold block 24 having a pipe 25 connected thereto and leading from a source of vacuum (not shown). Said manifold block 24 is adapted to serve a plurality of individual formers, best illustrated in Figure 4 and indicated generally by the reference numeral 26. Each such former 26 comprises a bottom disk 27 having a central cylindrical bore 27a extending therethrough, and an upper disk 29 having a central cylindrical recess 30 formed in the under surface thereof. A perforated metal tube 31 is adapted to be positioned between the upper and lower disks 29 and 27, with the lower end of the tube suitably secured in the bore 27a and the upper end of the disk extending into the recess 30. In order to provide for the ready removal of the tube 31 from the bore 27a, there may be provided a bayonet slot 32 in said lower end of the tube 31 and a cooperating projection 33 in the wall of said bore 27a. A pair of spring prongs 28 extends downwardly from each bore 27a for insertion into and engagement with the apertured manifold block 24.

A foraminous disk 33 of woven wire, or the like is adapted to be positioned under the disk 29 against the lower surface thereof. The purpose of the foraminous disk 33 is to assist in the deposition of fibers near the top of the tube 31 and in the removal of water from the upper end of the filter carcass that is to be built up on the former 26, as will now be explained.

With the felting tank equipment in operation, suction is applied to the manifold block 24 through the pipe connection 25, and thence through the individual bores 27a in the bottom disk 27 to the individual perforated tubes 31 of the formers 26. The degree of vacuum applied is controlled, in conjunction with the proper arrangement and size of apertures 34 in the tubes 31 to lay the fibers about said tubes 31 in uniform and concentric layers to build up wet carcasses 36 (Fig. 3), which increase in diameter as the accretion of the fibers on the tubes 31 continues. As the thickness of the walls of the carcasses 31 increases, the effective pull of the vacuum upon the fibers then being deposited is diminished, so that the fibers are more loosely felted as the diameter of the carcasses increases. This results in a carcass, the interstices of which gradually become larger as the radial distance from the inside layer increases. There is thus produced a filter carcass of graded porosity between the inside and outside layers although all of said layers are composed of identical mixtures of resin-impregnated fibrous material.

The amount of vacuum and the time over which the vacuum is applied vary with the formulation of fibrous material that is employed. The degree of vacuum used ranges from 6 to 28 inches of mercury, with the time ranging from 30 seconds to three minutes for the accretion of the fibers, depending upon the formulation and the desired outside diameter. For a fibrous composition of 85% wool and 15% esparto, or 85% wool and 15% Yucca, a higher vacuum toward the upper limit of the specified range will be found suitable, and a shorter length of time, but still within the specified range, will be required than for 100% wool. Cotton fibers can be substituted for the esparto or Yucca, or even for the wool, it being possible by my method to make a filter of 100% cotton fibers.

As the fibers build up on the formers, or dies, the amount of vaccum applied is preferably gradually increased, due to the greater resistance necessary to pull the aqueous resin solution, or dispersion, through the greater depth of accreted fibers, but the amount of vacuum is so controlled that a graded porosity, as above described, is obtained. The accretion of the fibers takes place so that each successive layer of fibers as deposited merges or interfelts with the previously deposited fibers to constitute a substantially homogeneous fibrous mass.

The consistency of the stock in the felting tank 15 is maintained at about one-half of 1% by weight, on an air-dry basis. The fibrous material is mixed with the resin dispersion and brought to this consistency before being charged into the felting tank. As previously stated, various resins, including the phenol, urea and melamine types of thermosetting resins or various types of thermoplastic resins, may be employed. The resins may be dispersed in a suitable solvent, and then the stock added and the mixture then brought to the desired consistency. The amount of resin used, on the basis of the fiber content, may range from 15 to 60%, by weight, the amount being varied in accordance with the strength of the fibrous filter element that is desired. In general, the larger the percentage of resin, the stronger and more rigid is the ultimate filter element. As an example of a formulation for producing a filter element having a compressive strength of the order of 50 pounds per square inch, or higher, this can be suitably accomplished by using a mixture of 85% wool and 15% esparto fibers with 35% resin, by weight of the fibers. Such a formulation, when processed as herein described, results in a filter element that is highly effective for filtering out foreign particles of the order of size of 25 micron diameter and over.

When the carcasses 36 have built up to the desired outside diameters, the manifold block 24 may be lifted out of the tank 15 with the suction still on, or the tank is drained without turning off the suction. The individual formers, or dies, 26, with the wet carcasses thereon, are then lifted off of the manifold block 24 and transferred to a drying cabinet, indicated generally by the reference numeral 37, in Figure 5. Said cabinet is provided with an elevated manifold block 38, similar to the block 24 but preferably mounted in inverted relationship so that the wet carcasses 36 on the individual formers 26 can be supported therefrom in inverted relationship. The purpose of inverting the formers and carcasses carried thereby is to counteract the tendency, in the forming operation, of the resin dispersion to become more concentrated toward the lower end of the carcass. Also, during the drying step, the tendency of the resin dispersion to flow upwardly in the direction of the air flow is counteracted by the pull of gravity on the resin dispersion. Heated air is drawn into the cabinet 37 through intake port 39 and drawn inwardly through the wet carcasses 36 into the manifold 38 by means of a suction fan 40. The time and temperature are so controlled that the water, or other solvent medium, is removed from the wet carcasses 36 to the extent desired. In the case of the specific formulation of 85% wool, 15% esparto and 35% resin by weight of the total fibers, using air heated to a temperature of 150° F. and up, about five minutes time suffices to dry the wet carcasses.

After drying, the filter carcasses are subjected to higher temperatures to set the resin. The setting of the resin may be accomplished in the same cabinet, but for purposes of illustration, a separate cabinet, indicated generally by the reference numeral 41 (Fig. 6) is shown for this purpose. During the setting operation, the flow of air through the carcasses is reversed from that used in drying the carcasses. Heated air is drawn through an intake 42 into a manifold 38 and through the carcasses 36 by means of a suction fan 43 connected with the interior of the cabinet 41 by means of an intake 44. The time required for setting the resin ranges from 5 to 20 minutes and the temperatures employed may vary between 250 and 350° F., or even higher. For the specific formulation above given of 85% wool and 15% esparto, five minutes at 300° F. produces satisfactory results.

The purpose of reversing the flow of air through the carcasses, as between the drying and setting operations, is to equalize the tendency of the resin to migrate in the direction of the air flow. In the drying operation, there is some tendency of the resin to migrate toward the interior of the carcasses 35, since the air is drawn in that direction, while in the setting operation, due to the reversal of flow of air through the carcasses, the tendency is to redistribute the resin uniformly throughout the masses of the carcasses. In addition, the outward flow of air in the setting operation tends to expand the carcass somewhat to give a more open, porous structure toward the outer portions of the carcass and to free the surface pores from any excess resin that might otherwise clog such pores.

In the next step, the carcasses are transferred to a curing cabinet, indicated generally by the reference numeral 45 (Fig. 7) in which the filter carcasses 36 are subjected to temperatures of from 250 to 350° F., or higher, for from one to four hours. With the specific formulation of 85% wool and 15% esparto, a temperature of around 280° F. and a time of about three hours are used. Heated air within the temperature range specified is drawn into the cabinet 45 through an intake 46 and exhausted through an outlet 47.

At the end of the curing step, the carcasses 35 are oversize and must be trimmed to the finished filter dimensions that are desired. Furthermore, the outer surfaces of the carcasses 36 are relatively rough and irregular and may have a surface film or agglomeration of resin that would seriously reduce the efficiency of the element for filtering purposes. Consequently, after curing, the filter carcass is sized to accurate dimensions by cutting, trimming or grinding. Preferably, the trimming is done by means of a saw, as illustrated in Fig. 8, which shows a filter carcass 36 mounted in vertical position upon a rotatable wheel 48 driven from a motor 49 by means of a belt and pulleys 50, 51 and 52. The vertical length of a band saw 53 is moved relatively to the axis of the rotatable disk 48 until it is in position to trim the outer surface of the carcass 56 to the desired external dimensions. Usually, about a sixteenth to an eighth of an inch is trimmed off of the surface of the rough carcass to make sure to remove any resin film or agglomeration of resin that may be present on the outer surface of such carcass. The ends of the carcass 36 are similarly trimmed by means of the band saw 53 to produce the plane end surfaces 13 and 13a (Figs. 1 and 2).

Because of the inclusion of this trimming operation, it is feasible to use a film-forming resin as well as a non-film-forming resin, since the elimination of the outer surface of the rough carcass also eliminates any pore-sealing resin film that may form during the curing or setting steps.

I claim as my invention:

1. A filter element for depth type filtration comprising a unitary, tubular, self-supporting structure sufficiently rigid to withstand radial compression loads in excess of 50 pounds per square inch without substantial deformation composed of an integral resin-bonded fibrous mass of graduated porosity from the inner to the outer surface, said mass containing resin substantially uniformly dispersed therethrough in an amount equal to about 35% to 60% of the weight of said mass, the outer surface of said structure being free from any pore-sealing resin film.

2. In the method of making a thick-walled, tubular fiber filter by accretion from an aqueous suspension of fibers to produce a carcass of graduated porosity, the improvement which comprises impregnating the fibers with a thermosetting resin in an amount equal to about 35% to 60% of the weight of the fibers, passing air heated to a drying temperature radially inward through the accreted wet tubular carcass of resin-impregnated fibers for a short time to dry the carcass without setting the resin, passing air heated to a resin-setting temperature in the opposite direction through the carcass for a period sufficient to set the resin, and then curing the resin in the dried tubular carcass.

3. In the method as claimed in claim 2, the step of trimming the outer tubular surface of the dried and resin-cured carcass to remove resin film present thereon and leave the pores of said outer surface open for effective filtering action.

4. A filter element for depth type filtration comprising a self-supporting, hollow, cylindrical body having sufficient rigidity to withstand radial compression loads in excess of 50 pounds per square inch without substantial deformation composed of an accretion of wool and vegetable fibers in the proportions by weight of between 60% and 90% of wool and 40% and 10% of vegetable fibers, said accreted body of fibers containing resin substantially uniformly dispersed therethrough in an amount equal to about 35% to 60% of the weight of the fibers, the outer surface of said body being free from any pore-sealing resin film.

5. A filter element as claimed in claim 4, in which the vegetable fibers are esparto fibers.

6. In the method of making a thick-walled, tubular fiber filter by accretion of fibers from an aqueous dispersion of such fibers to produce a carcass of graduated porosity, the improvement which comprises impregnating the fibers with an amount of thermo-setting resin equal to about 35% to 60% of the weight of the fibers, drying the wet tubular carcass by subjecting it to heat below the resin-setting temperature, passing air heated to a resin-setting temperature radially outward through the tubular carcass for a period sufficient to set the resin, and then curing the resin in the dried tubular carcass.

7. In the method as claimed in claim 6, the step of trimming the outer tubular surface of the dried and resin-cured carcass to remove resin film present thereon and leave the pores of said outer surface open for effective filtering action.

LOUIS E. ANDERSON.

REFERENCES CITED

The following references are of record in the file of this patent:

UNITED STATES PATENTS

| Number | Name | Date |
|---|---|---|
| 207,337 | Austin | Aug. 27, 1878 |
| 956,832 | Seitz | May 3, 1910 |
| 1,256,171 | Seitz et al. | Feb. 12, 1918 |
| 1,368,540 | Bovard | Feb. 15, 1921 |
| 1,845,970 | Katz | Feb. 16, 1932 |
| 2,131,004 | Austin | Sept. 20, 1938 |
| 2,269,725 | Malanowski | Jan. 13, 1942 |
| 2,321,756 | Kyle | June 15, 1943 |
| 2,369,488 | Perry | Feb. 13, 1945 |
| 2,383,066 | McDermott | Aug. 21, 1945 |
| 2,386,684 | Hermanson | Oct. 9, 1945 |
| 2,395,301 | Sloan | Feb. 19, 1946 |
| 2,421,704 | Kasten | June 3, 1947 |
| 2,437,265 | Manning | Mar. 9, 1948 |

OTHER REFERENCES

Textile Fibers, by Matthews, 4th edition, 1924, pp. 858 and 859.